United States Patent
Chen (10) Patent No.: US 7,367,432 B2
(45) Date of Patent: May 6, 2008

(54) BRAKE DEVICE FOR PUSHCART

(75) Inventor: Shun-Min Chen, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 257 days.

(21) Appl. No.: 11/151,852

(22) Filed: Jun. 13, 2005

(65) Prior Publication Data

US 2006/0169546 A1 Aug. 3, 2006

(30) Foreign Application Priority Data

Jan. 28, 2005 (CN) ................. 2005 2 00015554 U (51) Int. Cl.
*B62B 5/04* (2006.01)
(52) U.S. Cl. .................... 188/19; 188/31; 188/2 D
(58) Field of Classification Search ............. 188/19, 188/20, 21, 22, 23, 24.16, 2 D, 31, 2 F; 280/642, 280/242.1, 250.1
See application file for complete search history.

(56) References Cited

U.S. PATENT DOCUMENTS

| 4,479,566 | A |   | 10/1984 | Ishii |          |
|-----------|---|---|---------|-------|----------|
| 4,567,964 | A | * | 2/1986  | Kassai | ........................ 188/20 |
| 4,997,066 | A | * | 3/1991  | Bigo  | ............................ 188/31 |
| 5,368,133 | A |   | 11/1994 | Yang  |          |
| 6,341,672 | B1 | * | 1/2002  | Yang et al. | .................... 188/20 |
| 7,059,452 | B2 | * | 6/2006  | Chen  | ............................ 188/20 |
| 7,175,004 | B2 | * | 2/2007  | Kassai et al. | .................. 188/20 |
| 2004/0178025 | A1 |   | 9/2004  | Zweideck |  |

FOREIGN PATENT DOCUMENTS

GB          2351131 A  * 12/2000

OTHER PUBLICATIONS

European Search Report dated Jul. 18, 2007, for EP 05014250.4, in the name of Wonderland Nurserygoods Co., Ltd.

* cited by examiner

*Primary Examiner*—Thomas Williams
(74) *Attorney, Agent, or Firm*—Christie, Parker & Hale, LLP (57) ABSTRACT

A brake device for a pushcart includes a main movable member disposed movably within a main seat, an auxiliary movable member disposed movably within an auxiliary seat, and a connecting member interconnecting the main and auxiliary movable members. The main movable member is biased to an upper limit position, and is movable to a lower limit position so as to engage a main brake pin with a groove in a main pin-engaging member that is connected fixedly to one wheel. Hence, the connecting member moves the auxiliary movable member from a first position to a second position so as to engage an auxiliary brake pin with a groove in an auxiliary pin-engaging member that is connected fixedly to another wheel. As a result, the wheels are locked.

24 Claims, 8 Drawing Sheets

BRAKE DEVICE FOR PUSHCART

CROSS-REFERENCE TO RELATED APPLICATION

This application claims priority of Chinese Application No. 2005200015554, filed on Jan. 28, 2005.

BACKGROUND OF THE INVENTION

1. Field of the Invention

This invention relates to a brake device for a pushcart, and more particularly to a brake device that includes an operating portion, which can be operated to lock two wheels.

2. Description of the Related Art

A conventional brake device includes two operating members that can be actuated to lock two aligned wheels. The use of two separate operating members results in a troublesome braking process. Such a brake device is disclosed in U.S. Pat. Nos. 4,479,566 and 5,368,133.

SUMMARY OF THE INVENTION

The object of this invention is to provide a brake device for a pushcart, which includes a single operating portion that can be actuated to lock and unlock two aligned wheels.

According to this invention, a brake device for a pushcart includes a main movable member disposed movably within a main seat, an auxiliary movable member disposed movably within an auxiliary seat, and a connecting member interconnecting the main and auxiliary movable members. The main movable member is biased to an upper limit position, and is movable to a lower limit position so as to engage a main brake pin with a groove in a main pin-engaging member that is connected fixedly to one wheel. Hence, the connecting member moves the auxiliary movable member from a first position to a second position so as to engage an auxiliary brake pin with a groove in an auxiliary pin-engaging member that is connected fixedly to another wheel. As a result, the wheels are locked.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Figure 1:
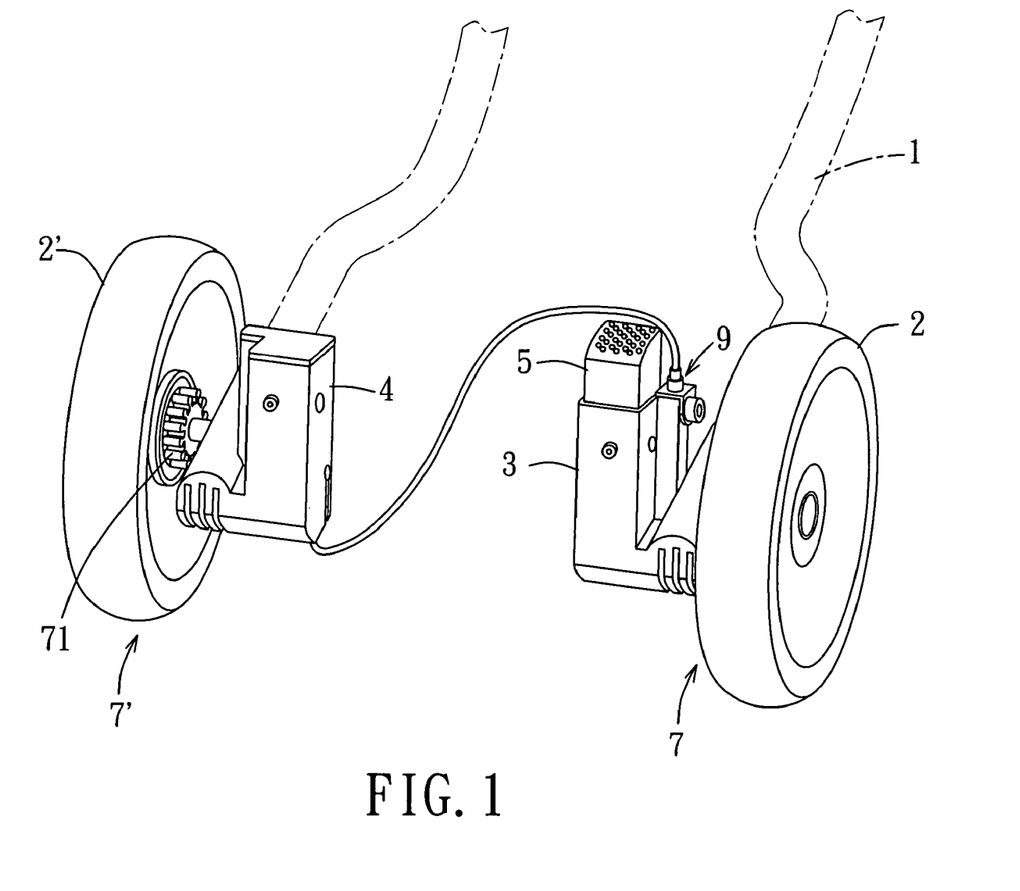
FIG. 1 is an assembled perspective view of the first preferred embodiment of a brake device for a pushcart according to this invention.

Referring to FIG. 1, the first preferred embodiment of a brake device according to this invention is mounted on a pushcart. The pushcart has a cart frame 1 and a pair of aligned first and second wheels 2, 2'.

Figure 2:
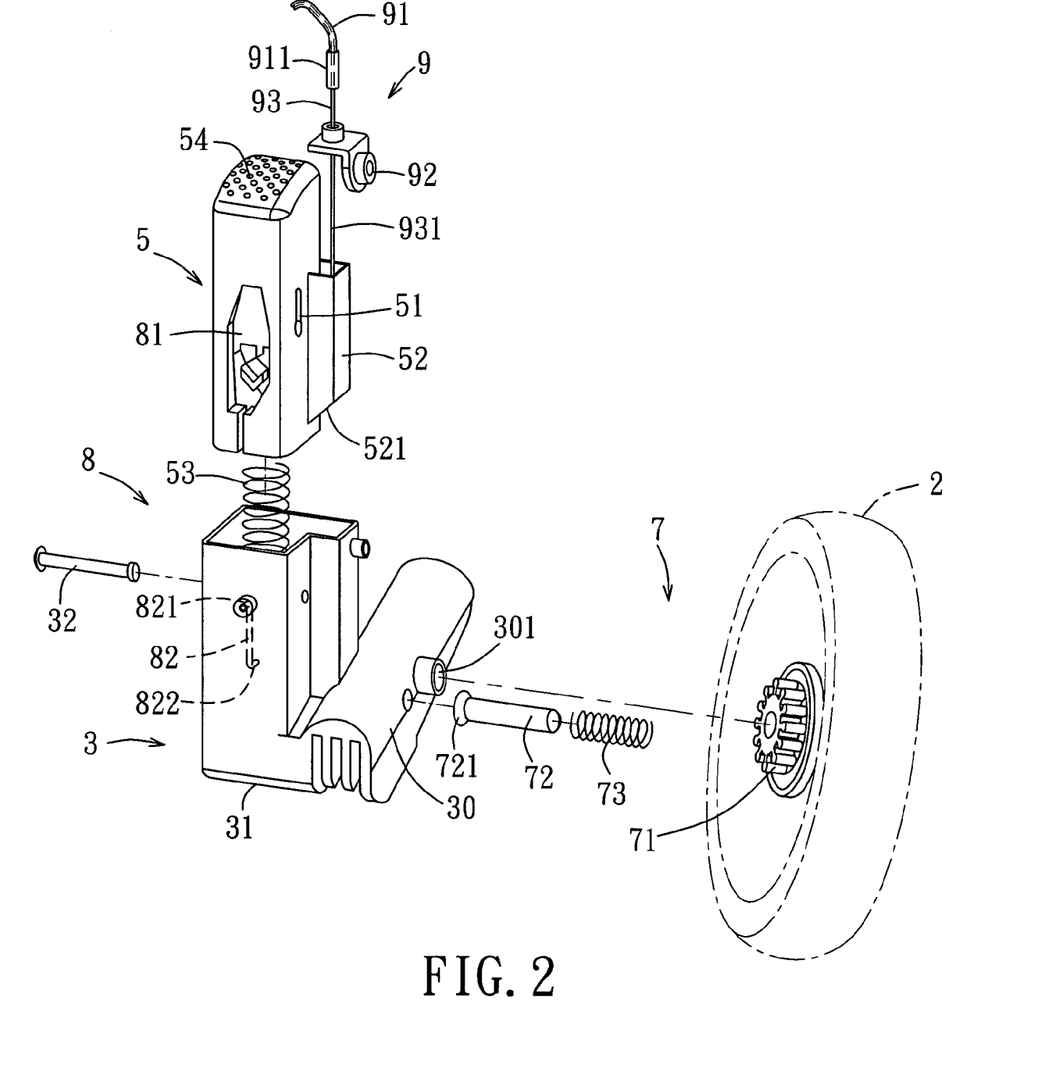
FIG. 2 is a fragmentary exploded perspective view of the first preferred embodiment, illustrating a structure for locking one wheel.
Figure 3:
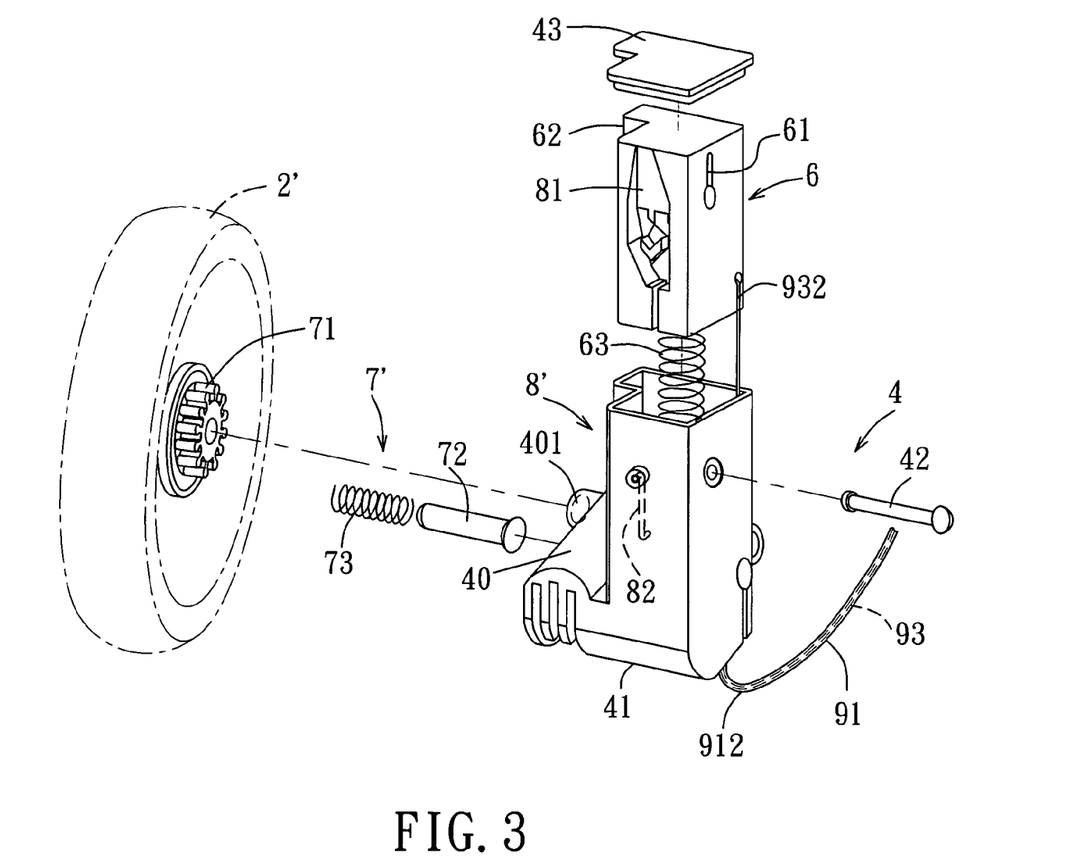
FIG. 3 is a fragmentary exploded perspective view of the first preferred embodiment, illustrating a structure for locking another wheel.

Referring to FIGS. 1, 2 and 3, the brake device includes a hollow main seat 3, a hollow auxiliary seat 4, a main movable member 5, an auxiliary movable member 6, a main brake mechanism 7, an auxiliary brake mechanism 7', a main positioning unit 8, an auxiliary positioning unit 8' and a drive unit 9.

The main and auxiliary seats 3, 4 are disposed fixedly on the cart frame 1, and are located respectively in proximity to the first and second wheels 2, 2'. Each of the main and auxiliary movable members 5, 6 is formed with a vertical slide slot 51, 61. Each of the main and auxiliary seats 3, 4 is configured as an upright tube, and includes a lower end wall 31, 41 and a fixed retaining pin 32, 42. The retaining pins 32, 42 are received respectively and slidably within the slide slots 51, 61. Therefore, the main and auxiliary movable members 5, 6 are retained respectively on the main and auxiliary seats 3, 4. The main movable member 5 has an outer surface that is formed with a cam portion 52. The cam portion 52 has a tapered lower end 521. The auxiliary movable member 6 also has an outer surface that is formed with a cam portion 62. The cam portion 62 also has a tapered lower end (not shown).

A main biasing member 53 is configured as a coiled compression spring, and is disposed between the main movable member 5 and the lower end wall 31 of the main seat 3. Thus, the main movable member 5 is biased by the main biasing member 53 to move upwardly away from the lower end wall 31 of the main seat 3 toward an upper limit position shown in FIG. 6.

An auxiliary biasing member 63 is configured as a coiled compression spring, and is disposed between the auxiliary movable member 6 and the lower end wall 41 of the auxiliary seat 4. Thus, the auxiliary movable member 6 is biased by the auxiliary biasing member 63 to move upwardly from the lower end wall 41 of the auxiliary seat 4 toward a first position corresponding to the upper limit position of the main movable member 5.

Figure 7:
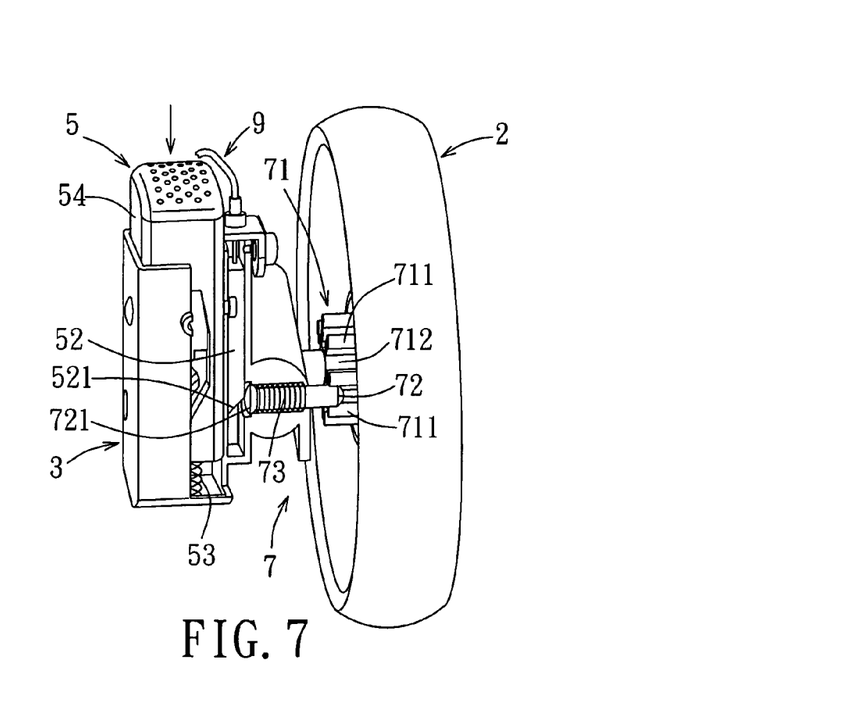
FIG. 7 is a fragmentary schematic view of the first preferred embodiment, illustrating a lower limit position of the main movable member.

The main movable member 5 has an operating portion 54 that projects from the main seat 3 and that can be pressed so that the main movable member 5 moves to a lower limit position shown in FIG. 7. The auxiliary movable member 6 is also movable downwardly to a second position corresponding to the lower limit position of the main movable member 5.

The main brake mechanism 7 includes a main pin-engaging member 71, a main brake pin 72 and a main resilient member 73. The auxiliary brake mechanism 7' is similar in construction to the main brake mechanism 7, and includes an auxiliary pin-engaging member 71, an auxiliary brake pin 72 and an auxiliary resilient member 73. The main and auxiliary pin-engaging members 71 are connected respectively and fixedly to the first and second wheels 2, 2'. Each of the main and auxiliary pin-engaging members 71 is formed with a plurality of ribs 711 (see FIG. 6) that extend radially and outwardly therefrom. Any adjacent two ribs 711 define a pin-engaging groove 712 therebetween.

Each of the main and auxiliary seats 3, 4 is formed with a wall unit 30, 40 that has a hole 301, 401. The main and auxiliary brake pins 72 extend respectively through the holes 301, 401 in the main and auxiliary seats 3, 4. The main and auxiliary brake pins 72 have heads 721 disposed respectively within the main and auxiliary seats 3, 4. The main and auxiliary resilient members 73 are configured as coiled compression springs, and are sleeved respectively on the main and auxiliary brake pins 72. The main resilient member 73 is disposed between the head 721 of the main brake pin 72 and the wall unit 30 of the main seat 3. Similarly, the auxiliary resilient member 73 is also disposed between the head 721 of the auxiliary brake pin 72 and the wall unit 40 of the auxiliary seat 4. As such, the head 721 of each of the main and auxiliary brake pins 72 is biased to move away from the corresponding wall unit 30, 40. This results in disengagement of the main and auxiliary brake pins 72 from the grooves 712 in the main and auxiliary pin-engaging members 71.

The main positioning unit 8 can hold the movable member 5 at the upper and lower limit positions. The auxiliary positioning unit 8' can hold the auxiliary member 6 at the first and second positions. Because the main and auxiliary positioning units 8, 8' are similar in construction, only the main positioning unit 8 is described in detail below.

Figure 4:
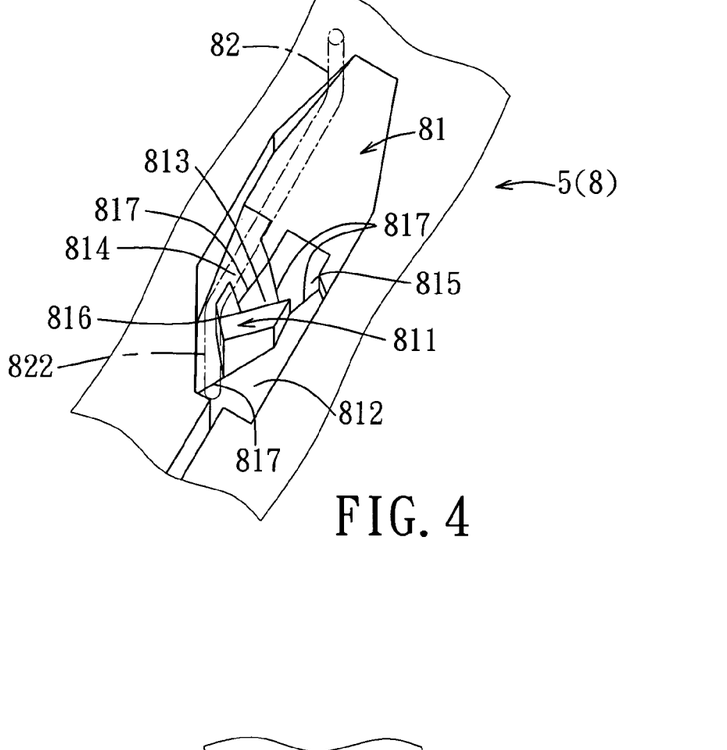
FIG. 4 is a fragmentary perspective view of a cam groove portion of a main movable member of the first preferred embodiment.
Figure 5:
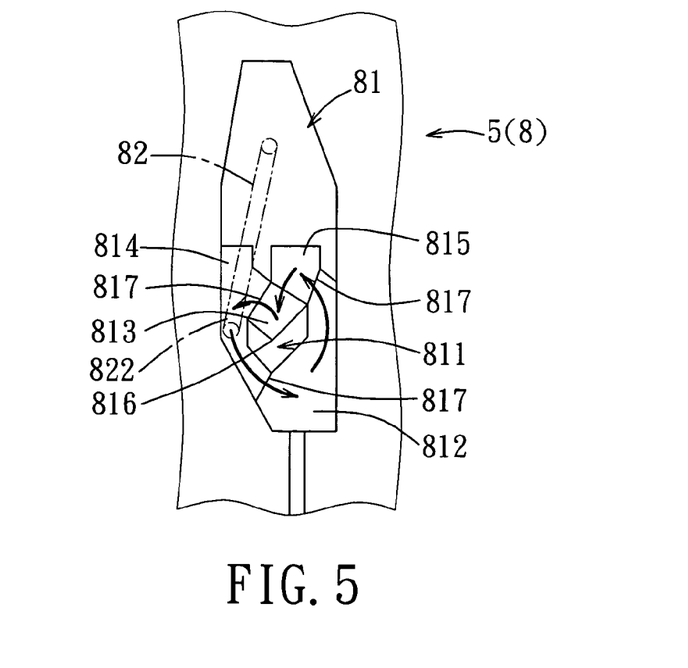
FIG. 5 is a side view of the cam groove portion of the main movable member of the first preferred embodiment.

Referring to FIGS. 2, 4 and 5, the main positioning unit 8 includes a cam groove portion 81 and a resilient lock pin 82. The lock pin 82 has a mounting end 821 mounted to an inner surface of the main seat 3, and an L-shaped insert end 822 engaging the cam groove portion 81. The cam groove portion 81 is formed on an outer surface of the main movable member 5, and has a V-shaped projection 811, and first, second, third and fourth slanting surfaces 812, 813, 814, 815. The V-shaped projection 811 defines a groove 816 for engaging the lock pin 82. The first, second, third and fourth slanting surfaces 812, 813, 814, 815 are disposed around the V-shaped projection 811. Any two adjacent ones of the first, second, third and fourth slanting surfaces 812, 813, 814, 815 are interconnected by an inclined guiding surface 817 in a known manner so as to constitute a stepped annular groove structure around the V-shaped projection 811. Thus, the insert end 822 of the lock pin 82 is guided to move around the V-shaped projection 811 in a predetermined direction shown by the arrows in FIG. 5 along a path defined by the first, fourth, second and third slanting surfaces 812, 815, 813, 814. When the insert end 822 of the lock pin 82 is disposed at the first slanting surface 812, the main movable member 5 is locked at the upper limit position.

When the operating portion 54 of the main movable member 5 is pressed to move the insert end 822 of the lock pin 82 onto the second slanting surface 813 via the fourth slanting surface 815, the main movable member 5 is locked at the lower limit position. Subsequently, when the operating portion 54 of the main movable member 5 is again pressed, the insert end 822 of the lock pin 82 moves from the second slanting surface 813 onto the first slanting surface 812 via the third slanting surface 814.

The drive unit 9 includes an outer tube 91, a cable-guiding member 92, and a connecting member 93 that is configured as a cable. The outer tube 91 is disposed between the main and auxiliary movable members 5, 6, and has opposite first and second ends 911, 912. The cable-guiding member 92 is disposed fixedly on an upper end of the main seat 3. The connecting member 93 extends through the outer tube 91, and has a driving end 931 projecting from the first end 911 of the outer tube 91, and a driven end 932 projecting from the second end 912 of the outer tube 91. The driving end 931 extends though the cable-guiding member 92 and the upper end of the main seat 3, and is fastened to the cam portion 52 of the main movable member 5 at a position under the cable-guiding member 92. Thus, when the main movable member 5 moves downwardly, the driving end 931 of the connecting member 93 is pulled downwardly away from the first end 911 of the outer tube 91. The driven end 932 extends through the lower end wall 41 of the auxiliary seat 4, and is fastened to a lower end of the auxiliary movable member 6. Thus, when the driven end 932 of the connecting member 93 moves toward the second end 912 of the outer tube 91, the auxiliary movable member 6 moves downwardly within the auxiliary seat 4.

As such, when the main movable member 5 moves downwardly from the upper limit position to the lower limit position, the auxiliary movable member 6 moves downwardly from the first position to the second position.

Figure 6:
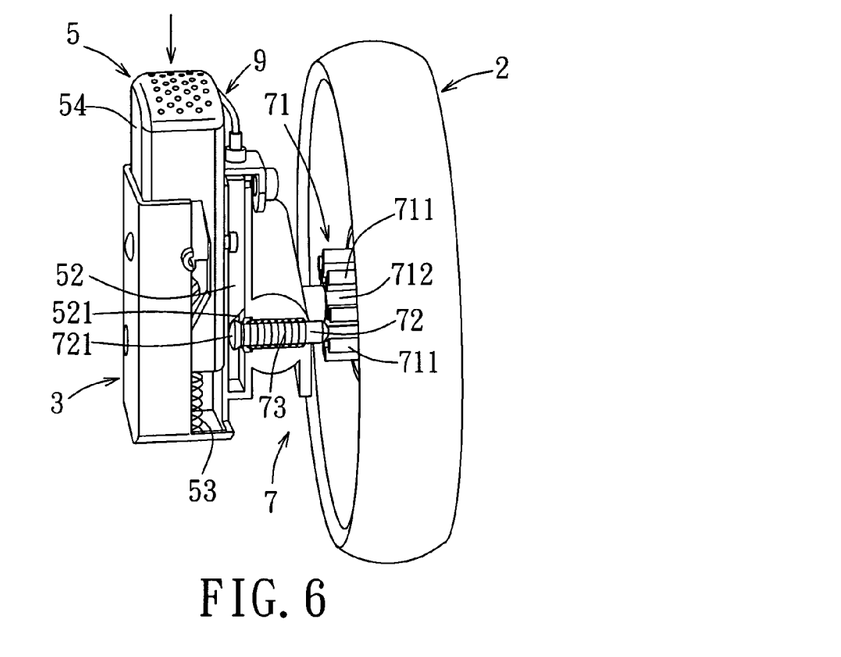
FIG. 6 is a fragmentary schematic view of the first preferred embodiment, illustrating an upper limit position of the main movable member.

When the main movable member 5 is disposed at the upper limit position, the head 721 of the main brake pin 72 is biased by the main resilient member 73 to press against the outer surface of the main movable member 5 at a position below the cam portion 52, as shown in FIG. 6. As such, the main brake pin 72 is disengaged from the grooves 712 in the main pin-engaging member 71. When the main movable member 5 is in the upper limit position, slack is provided in the connecting member 93, and the auxiliary movable member 6 is biased by the auxiliary biasing member 63 to its upper limit position (i.e., the first position), as described above. Thus, the auxiliary brake pin 72 is also disengaged from the grooves 712 in the auxiliary pin-engaging member 71. As a result, rotation of the first and second wheels 2, 2' is allowed.

When the main movable member 5 is pressed to the lower limit position, the main brake pin 72 presses against the cam portion 52 of the main movable member 5. Thus, the cam portion 52 moves the main brake pin 72 to engage one of the grooves 712 in the main pin-engaging member 71. At the same time, corresponding movement of the connecting member 93 effects movement the auxiliary movable member 6 to the second position so as to engage the auxiliary brake pin 72 with one of the grooves 712 in the auxiliary pin-engaging member 71. As a result, the first and second wheels 2, 2' are locked, and the main movable member 5 and the auxiliary movable member 6 are held respectively at the lower limit position and the second position.

Subsequently, when the main movable member 5 is pressed once again, the main positioning unit 8 cooperates with the main biasing member 53 to move the main movable member 5 back to the upper limit position. On the other hand, the auxiliary positioning unit 8' cooperates with the auxiliary biasing member 63 to move the auxiliary movable member 6 back to the first position.

FIGS. 8, 9, 10 and 11 show the second preferred embodiment of a brake device according to this invention. The structural and operational aspects of the second preferred embodiment different from those of the first preferred embodiment are described in the succeeding paragraphs.

Figure 8:
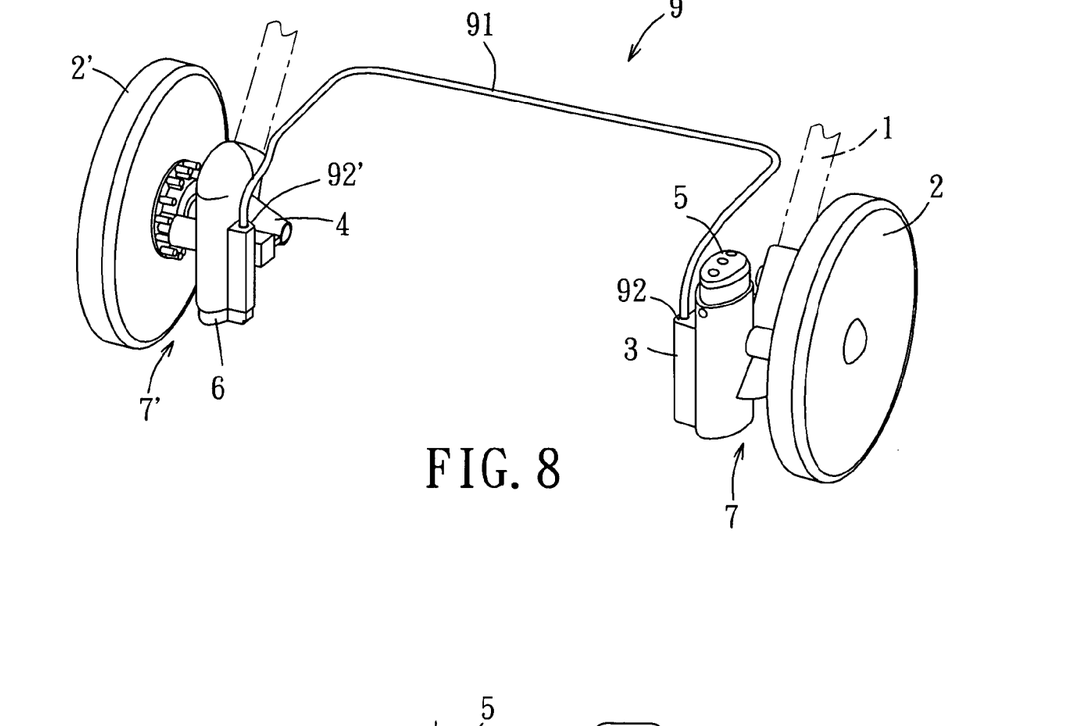
FIG. 8 is an assembled perspective view of the second preferred embodiment of a brake device for a pushcart according to this invention.
Figure 11:
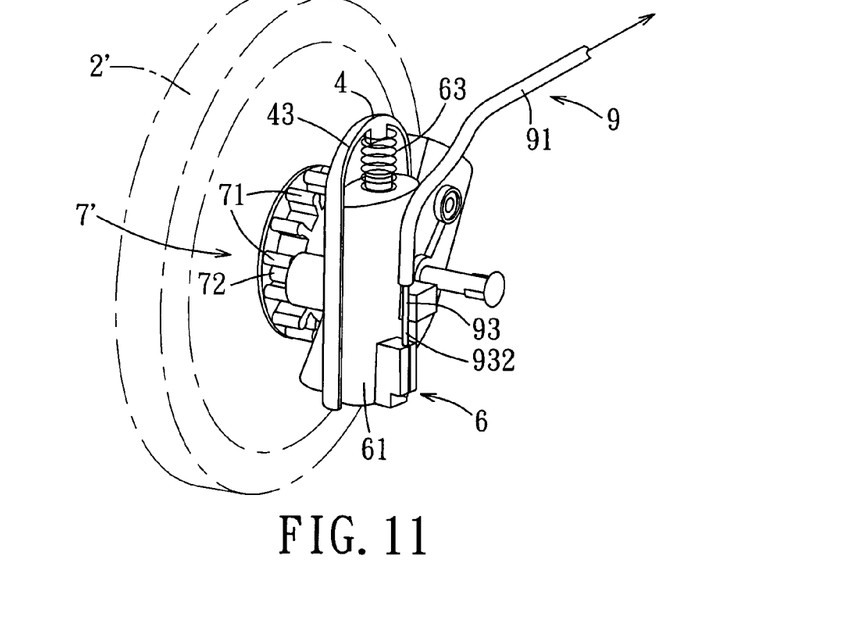
FIG. 11 is a fragmentary perspective view of the second preferred embodiment, illustrating a structure for locking one wheel.

The main seat 3 includes an integral horizontal tube 33 that has a proximate end 331 proximate to the main seat 3, and a distal end 332 distal from the main seat 3. The horizontal tube 33 is formed with an inner flange 333 and an outer flange 334 that extend respectively, radially and inwardly from the proximate end 331 and the distal end 332.

The main brake pin 72 extends through the horizontal tube 33, and has an engaging end 722 that is movable to engage one of the grooves 712 in the main pin-engaging member 71, and a mounting end 723 that is opposite to the engaging end 722 and that has a cam follower 724. The cam portion 52 of the main movable member 5 is disposed between the cam follower 724 and the horizontal tube 33. The main brake pin 72 is provided with a fixed outward flange 74 that extends radially and outwardly therefrom and that is disposed between the inner and outer flanges 333, 334 of the horizontal tube 33. The cam follower 724 of the main brake pin 72 is movable to engage the cam portion 52 of the main movable member 5. The cam portion 52 of the main movable member 5 has a wide lower portion 522 and a narrow upper portion 523.

The main resilient member 73 is configured as a coiled compression spring, and is sleeved on the main brake pin 72 between the inner flange 333 of the horizontal tube 33 and the outward flange 74 of the main brake pin 72. Therefore, the main brake pin 72 is biased toward the main pin-engaging member 71.

Figure 12:
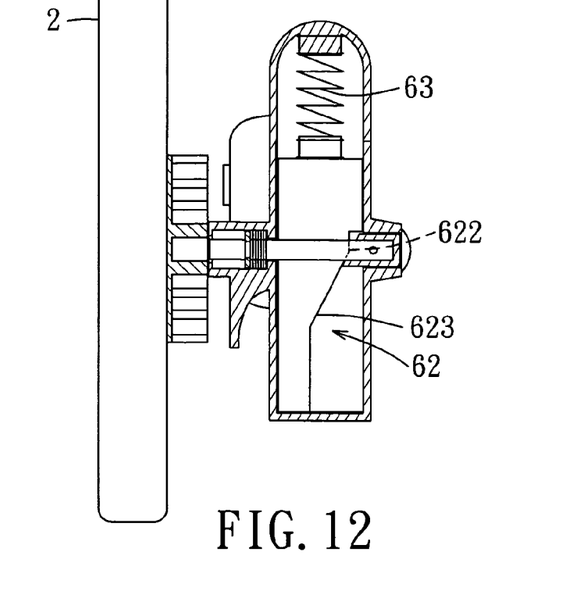
FIG. 12 is a fragmentary schematic view of the second preferred embodiment, illustrating a first position of an auxiliary movable member.

The auxiliary seat 4 has an upper end wall 43. The auxiliary biasing member 63 is disposed between the auxiliary movable member 6 and the upper end wall 43 of the auxiliary seat 4. As such, the auxiliary movable member 6 is biased to move downwardly away from the upper end wall 43 of the auxiliary seat 4 to the first position (i.e., its lower limit position).

The cable-guiding member 92 is formed integrally with the main seat 3. The connecting member 93 is connected to the main movable member 5 in the same manner as in the first preferred embodiment. The drive unit 9 further includes another cable-guiding member 92' formed integrally with the auxiliary seat 4 and connected to the auxiliary movable member 6 in the same manner in which the connecting member 93 is connected to the main movable member 5. As such, downward movement of the main movable member 5 within the main seat 3 results in upward movement of the auxiliary movable member 6 within the auxiliary seat 4.

Figure 9:
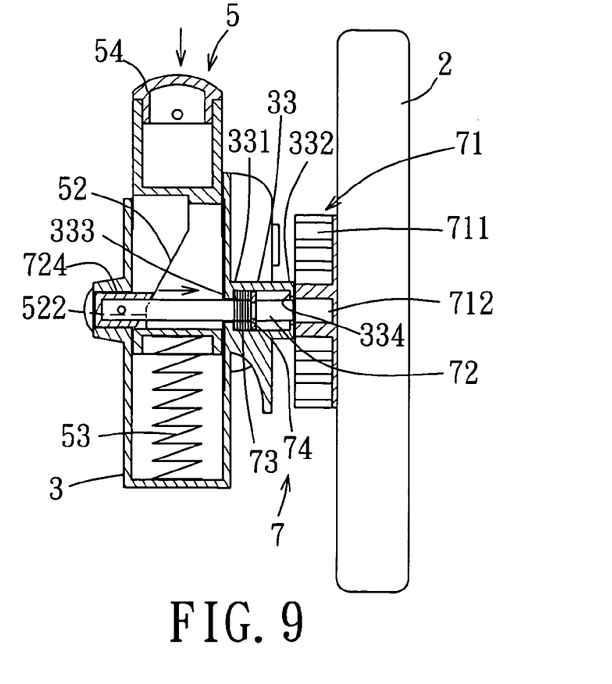
FIG. 9 is a fragmentary schematic view of the second preferred embodiment, illustrating an upper limit position of a main movable member.

When the main movable member 5 is disposed at the upper limit position shown in FIG. 9, the cam follower 724 of the main brake pin 72 engages the wide lower portion 522 of the main movable member 5 so that the main brake pin 72 is disengaged from the grooves 712 in the main pin-engaging member 71. At this time, the auxiliary movable member 6 is biased by the auxiliary biasing member 63 downwardly to the first position shown in FIG. 12. In the first position, the cam follower 724 of the auxiliary brake pin 72 engages a wide upper portion 622 of the cam portion 62 of the auxiliary movable member 6. As such, the auxiliary brake pin 72 is disengaged from the grooves 712 in the auxiliary pin-engaging member 71. As a result, rotation of the first and second wheels 2, 2' is allowed.

Figure 10:
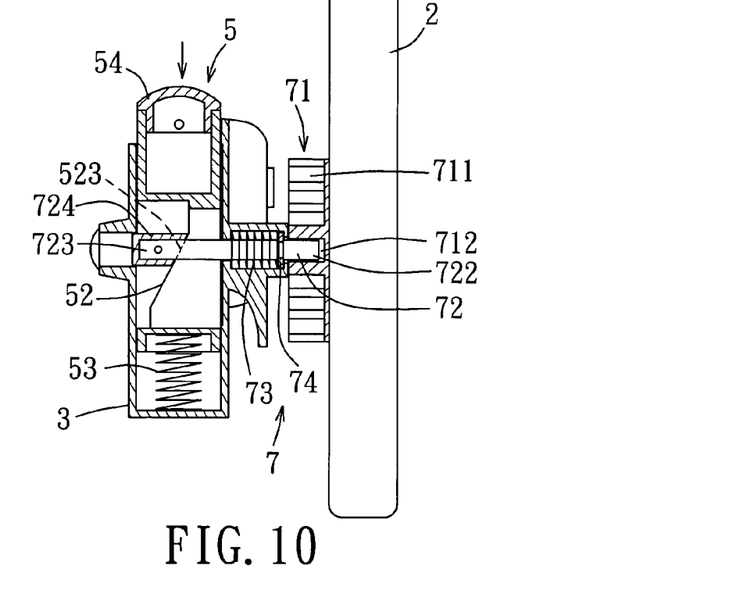
FIG. 10 is a fragmentary schematic view of the second preferred embodiment, illustrating a lower limit position of the main movable member.
Figure 13:
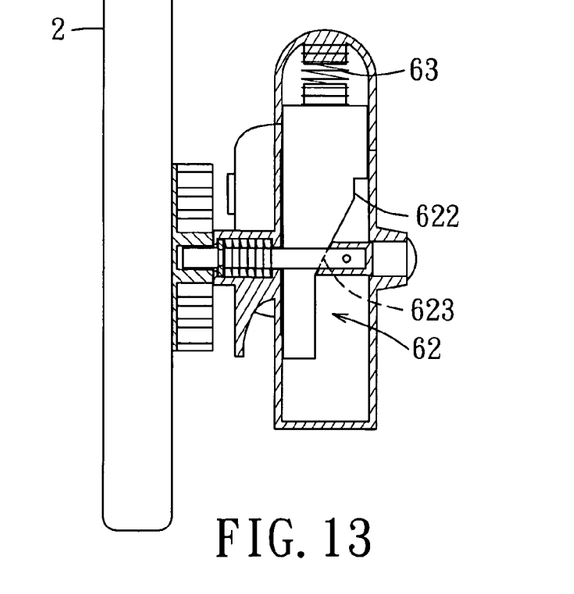
FIG. 13 is a fragmentary schematic view of the second preferred embodiment, illustrating a second position of the auxiliary movable member.

When the operating portion 54 of the main movable member 5 is pressed so that the main movable member 5 moves to the lower limit position shown in FIG. 10, the cam follower 724 of the main brake pin 72 engages the narrow upper portion 523 of the cam portion 52 of the main movable member 5. Hence, the main brake pin 72 is biased by the main resilient member 73 to engage one of the grooves 712 in the main pin-engaging member 71. At the same time, the connecting member 93 moves said auxiliary movable member 6 upwardly to the second position shown in FIG. 13. In the second position, the cam follower 724 of the auxiliary brake pin 72 engages a narrow lower portion 623 of the cam portion 62 of the auxiliary movable member 6. Hence, the auxiliary brake pin 72 is biased by the auxiliary resilient member 73 to engage one of the grooves 712 in the auxiliary pin-engaging member 71. As a result, the first and second wheels 2, 2' are locked.

In this embodiment, the main positioning unit 8 (see FIG. 2) is preserved, and the auxiliary positioning unit 8' (see FIG. 3) is omitted.

With this invention thus explained, it is apparent that numerous modifications and variations can be made without departing from the scope and spirit of this invention. It is therefore intended that this invention be limited only as indicated by the appended claims.

I claim:

1. A brake device for a pushcart, the pushcart having a cart frame and a pair of aligned first and second wheels, said brake device comprising:
   a hollow main seat adapted to be disposed fixedly on the cart frame and in proximity to the first wheel;
   a main movable member disposed movably within said main seat and movable between upper and lower limit positions;
   a main biasing member for biasing said main movable member to said upper limit position;
   a main positioning unit for holding said main movable member at said upper and lower limit positions;
   a hollow auxiliary seat adapted to be disposed fixedly on the cart frame and in proximity to the second wheel;
   an auxiliary movable member disposed movably within said main seat and movable between first and second positions;
   an auxiliary biasing member for biasing said auxiliary movable member to said first position;
   an auxiliary positioning unit for holding said auxiliary movable member at said first and second positions;
   a connecting member interconnecting said main and auxiliary movable members such that movement of said main movable member from said upper limit position to said lower limit position results in movement of said auxiliary movable member from said first position to said second position, and such that movement of said main movable member from said lower limit position to said upper limit position results in movement of said auxiliary movable member from said second position to said first position;
   a main brake mechanism adapted to be disposed between said main seat and the first wheel and including a main pin-engaging member that is adapted to be connected fixedly to the first wheel and that is formed with a plurality of grooves, and a main brake pin connected to said main seat and said main movable member so as to engage one of said grooves in said main pin-engaging member when said main movable member is disposed at said lower limit position, and so as to disengage from the one of said grooves in said main pin-engaging member when said main movable member is disposed at said upper limit position; and an auxiliary brake mechanism adapted to be disposed between said auxiliary seat and the second wheel and including an auxiliary pin-engaging member that is adapted to be connected fixedly to the second wheel and that is formed with a plurality of grooves, and an auxiliary brake pin connected to said auxiliary seat and said auxiliary movable member so as to engage one of said grooves in said auxiliary pin-engaging member when said auxiliary movable member is disposed at said second position, and so as to disengage from the one of said grooves in said main pin-engaging member when said main movable member is disposed at said first position.

wherein said main positioning unit includes:

a cam groove portion formed on an outer surface of said main movable member and having first, second, third and fourth slanting surfaces, and four inclined guiding surfaces, any two adjacent ones of said first, second, third and fourth slanting surfaces being interconnected by a corresponding one of said inclined guiding surfaces; and a resilient lock pin having a mounting end mounted to an inner surface of said main seat, and an L-shaped insert end engaging said cam groove portion, said lock pin being guided by said inclined guiding surfaces to move on said cam groove portion along a predetermined direction such that said main movable member can be pressed downwardly to move from said upper limit position to said lower limit position and from said lower limit position to said upper limit position, said lock pin engaging said first slanting surface when said main movable member is disposed at said upper limit position, said lock pin engaging said second slanting surface when said main movable member is disposed at said lower limit position.

2. The brake device as claimed in claim 1, wherein each of said main and auxiliary pin-engaging members is formed with a plurality of ribs that extend radially and outwardly therefrom, any two adjacent ones of said ribs defining a corresponding one of said grooves.

3. The brake device as claimed in claim 1, wherein each of said main and auxiliary seats is configured as an upright tube, and said connecting member is configured as a cable, said main movable member being movable within said main seat in a vertical direction, said auxiliary movable member being movable within said auxiliary seat in a vertical direction.

4. The brake device as claimed in claim 1, wherein each of said main and auxiliary seats is configured as an upright tube, and said connecting member is configured as a cable, said main movable member being movable within said main seat in a vertical direction, said auxiliary movable member being movable within said auxiliary seat in a vertical direction.

5. The brake device as claimed in claim 4, wherein said first position is disposed above said second position, downward movement of said main movable member within said main seat resulting in downward movement of said auxiliary movable member within said auxiliary seat.

6. The brake device as claimed in claim 5, further comprising an outer tube disposed between said main and auxiliary movable members, said connecting member being configured as a cable and extending through said outer tube.

7. The brake device as claimed in claim 6, wherein said main seat has an upper end that is provided with a fixed cable-guiding member, said outer tube having opposite first and second ends, said connecting member having a driving end projecting from said first end of said outer tube, said driving end of said connecting member extending through said cable-guiding member and an upper end of said main seat and being fastened to said main movable member at a position under said cable-guiding member, said driving end of said connecting member being pulled away from said first end of said outer tube when said main movable member moves downwardly within said main seat.

8. The brake device as claimed in claim 7, wherein said auxiliary seat has a lower end wall, said connecting member further having a driven end that extends through said lower end wall of said auxiliary seat and that is fastened to a lower end of said auxiliary movable member.

9. The brake device as claimed in claim 1, wherein said main brake mechanism includes a main resilient member that is disposed within said main seat and that biases said main brake pin to disengage from said main pin-engaging member when said main movable member is disposed at said upper limit position, said main movable member having an outer surface that is formed with a cam portion which has a tapered lower end, said main brake pin being biased by said main resilient member to press against said outer surface of said main movable member at a position below said cam portion when said main movable member is disposed at said upper limit position, and against said cam portion when said main movable member is disposed at said lower limit position.

10. The brake device as claimed in claim 9, wherein said main seat is formed with a wall unit that has a hole, said main brake pin extending through said hole in said wall unit of said main seat, said main brake pin having a head disposed within said main seat, said main resilient member being configured as a coiled compression spring and being sleeved on said main brake pin between said head and said wall unit of said main seat so as to bias said head to move away from said wall unit of said main seat.

11. The brake device as claimed in claim 5, wherein said main seat has a lower end wall, said main biasing member being configured as a coiled compression spring and being disposed between said main movable member and said lower end wall of said main seat so as to bias said main movable member to move upwardly away from said lower end wall of said main seat toward said upper limit position.

12. The brake device as claimed in claim 5, wherein said auxiliary seat has a lower end wall, said auxiliary biasing member being configured as a coiled compression spring and being disposed between said auxiliary movable member and said lower end wall of said auxiliary seat so as to bias said auxiliary movable member to move upwardly away from said lower end wall toward said first position.

13. The brake device as claimed in claim 4, wherein said first position is disposed below said second position, and wherein downward movement of said main movable member within said main seat will result in upward movement of said auxiliary movable member within said auxiliary seat.

14. The brake device as claimed in claim 13, further comprising an outer tube disposed between said main and auxiliary movable members, said connecting member being configured as a cable and extending through said outer tube.

15. The brake device as claimed in claim 14, wherein each of said main and auxiliary seats includes a fixed cable-guiding member, said connecting member having a driving end that extends through said cable-guiding member of said main seat and that is fastened to said main movable member at a position under said cable-guiding member of said main seat, and a driven end that extends through said cable-guiding member of said auxiliary seat and that is fastened to said auxiliary movable member at a position under said cable-guiding member of said auxiliary seat.

16. The brake device as claimed in claim 13, wherein said main brake mechanism includes a main resilient member that is disposed within said main seat, said main brake pin having a cam follower, said main movable member being formed with a cam portion that has a narrow upper portion and a wide lower portion which is wider than said narrow upper portion, said main resilient member biasing said cam follower to press against said wide lower portion of said cam portion so as to disengage said main brake pin from said grooves in said main pin-engaging member when said main movable member is disposed at said upper limit position, said main resilient member biasing said cam follower to press against said narrow upper portion of said cam portion so as to engage said main brake pin with the one of said grooves in said main pin-engaging member when said main movable member is disposed at said lower limit position.

17. The brake device as claimed in claim 16, wherein said main seat has a lower end wall, said main biasing member being configured as a coiled compression spring and being disposed between said main movable member and said lower end wall of said main seat so as to bias said main movable member to move upwardly away from said lower end wall of said main seat.

18. The brake device as claimed in claim 13, wherein said auxiliary brake mechanism includes an auxiliary resilient member that is disposed within said auxiliary seat, said auxiliary brake pin having a cam follower, said auxiliary movable member being formed with a cam portion that has a wide upper portion and a narrow lower portion which is narrower than said wide upper portion, said auxiliary resilient member biasing said cam follower to press against said wide upper portion of said cam portion so as to disengage said auxiliary brake pin from said grooves in said auxiliary pin-engaging member when said auxiliary movable member is disposed at said first position, said auxiliary resilient member biasing said cam follower to press against said narrow lower portion of said cam portion so as to engage said auxiliary brake pin with the one of said grooves in said auxiliary pin-engaging member when said auxiliary movable member is disposed at said second position.

19. The brake device as claimed in claim 18, wherein said auxiliary seat has an upper end wall, said auxiliary biasing member being configured as a coiled compression spring and being disposed between said auxiliary movable member and said upper end wall of said auxiliary seat so as to bias said auxiliary movable member to move downwardly away from said upper end wall of said auxiliary seat.

20. The brake device as claimed in claim 13, wherein said main seat includes an integral horizontal tube that has a proximate end proximate to said main seat, and a distal end distal from said main seat, said horizontal tube being formed with an inner flange extending radially and inwardly from said proximate end, and an outer flange extending radially and inwardly from said distal end, said main brake pin extending through said horizontal tube and having an engaging end that is movable to engage the one of said grooves in said main pin-engaging member, and a mounting end that is opposite to said engaging end and that has a cam follower, said main movable member having a cam portion disposed between said cam follower and said horizontal tube, said main brake pin including a fixed outward flange that extends radially and outwardly therefrom and that is disposed between said inner and outer flanges of said horizontal tube, said main resilient member being configured as a coiled compression spring that is sleeved on said main brake pin and that is disposed between said inner flange of said horizontal tube and said outward flange of said main brake pin so as to bias said main brake pin toward said main pin-engaging member and so as to bias said cam follower to press against said cam portion.

21. A brake device for a pushcart, the pushcart having a cart frame and a wheel, said brake device comprising:
a hollow main seat adapted to be disposed fixedly on the cart frame and in proximity to the wheel;
a main movable member disposed movably within said main seat and movable between upper and lower limit positions;
a main biasing member for biasing said main movable member to said upper limit position;
a main positioning unit for holding said main movable member at said upper and lower limit positions; and
a main brake mechanism adapted to be disposed between said main seat and the wheel and including a main pin-engaging member that is adapted to be connected fixedly to the wheel and that is formed with a plurality of grooves, and a main brake pin connected to said main seat and said main movable member so as to engage one of said grooves in said main pin-engaging member when said main movable member is disposed at said lower limit position, and so as to disengage from the one of said grooves in said main pin-engaging member when said main movable member is disposed at said upper limit positions;
wherein said main positioning unit includes:
a cam groove portion formed on an outer surface of said main movable member and having first, second, third and fourth slanting surfaces, and four inclined guiding surfaces, any two adjacent ones of said first, second, third and fourth slanting surfaces being interconnected by a corresponding one of said inclined guiding surfaces; and
a resilient lock pin having a mounting end mounted to an inner surface of said main seat, and an L-shaped insert end engaging said cam groove portion, said lock pin being guided by said inclined guiding surfaces to move on said cam groove portion along a predetermined direction such that said main movable member can be pressed downwardly to move from said upper limit position to said lower limit position and from said lower limit position to said upper limit position, said lock pin engaging said first slanting surface when said main movable member is disposed at said upper limit position, said lock pin engaging said second slanting surface when said main movable member is disposed at said lower limit position.

22. The brake device as claimed in claim 21, wherein said main brake mechanism includes a main resilient member that is disposed within said main seat and that biases said main brake pin to disengage from said main pin-engaging member when said main movable member is disposed at said upper limit position, said main movable member having an outer surface that is formed with a cam portion which has a tapered lower end, said main brake pin being biased by said main resilient member to press against said outer surface of said main movable member at a position below said cam portion when said main movable member is disposed at said upper limit position, and against said cam portion when said main movable member is disposed at said lower limit position.

23. The brake device as claimed in claim 21, wherein said main brake mechanism includes a main resilient member that is disposed within said main seat, said main brake pin having a cam follower, said main movable member being formed with a cam portion that has a narrow upper portion and a wide lower portion which is wider than said narrow upper portion, said main resilient member biasing said cam follower to press against said wide lower portion of said cam portion so as to disengage said main brake pin from said grooves in said main pin-engaging member when said main movable member is disposed at said upper limit position, said main resilient member biasing said cam follower to press against said narrow upper portion of said cam portion so as to engage said main brake pin with the one of said grooves in said main pin-engaging member when said main movable member is disposed at said lower limit position.

24. A brake device for a pushcart, the pushcart having a cart frame and a pair of aligned first and second wheels, said brake device comprising:
 a hollow main seat adapted to be disposed fixedly on the cart frame and in proximity to the first wheel;
 a main movable member disposed movably within said main seat and movable between upper and lower limit positions;
 a main biasing member for biasing said main movable member to said upper limit position;
 a main positioning unit for holding said main movable member at said upper and lower limit positions;
 a hollow auxiliary seat adapted to be disposed fixedly on the cart frame and in proximity to the second wheel;
 an auxiliary movable member disposed movably within said main seat and movable between first and second positions;
 an auxiliary biasing member for biasing said auxiliary movable member to said first position;
 an auxiliary positioning unit for holding said auxiliary movable member at said first and second positions;
 a connecting member interconnecting said main and auxiliary movable members such that movement of said main movable member from said upper limit position to said lower limit position results in movement of said auxiliary movable member from said first position to said second position, and such that movement of said main movable member from said lower limit position to said upper limit position results in movement of said auxiliary movable member from said second position to said first position;
 a main brake mechanism adapted to be disposed between said main seat and the first wheel and including a main pin-engaging member that is adapted to be connected fixedly to the first wheel and that is formed with a plurality of grooves, and a main brake pin connected to said main seat and said main movable member so as to engage one of said grooves in said main pin-engaging member when said main movable member is disposed at said lower limit position, and so as to disengage from the one of said grooves in said main pin-engaging member when said main movable member is disposed at said upper limit position; and
 an auxiliary brake mechanism adapted to be disposed between said auxiliary seat and the second wheel and including an auxiliary pin-engaging member that is adapted to be connected fixedly to the second wheel and that is formed with a plurality of grooves, and an auxiliary brake pin connected to said auxiliary seat and said auxiliary movable member so as to engage one of said grooves in said auxiliary pin-engaging member when said auxiliary movable member is disposed at said second position, and so as to disengage from the one of said grooves in said main pin-engaging member when said main movable member is disposed at said first position, wherein said first position is disposed above said second position, and wherein downward movement of said main movable member within said main seat will result in downward movement of said auxiliary movable member within said auxiliary seat.

* * * * *